United States Patent Office 3,028,386
Patented Apr. 3, 1962

3,028,386
4-(DICHLOROACET-N-METHYL AMIDO)PHENYL-2-FUROATE
Peter Oxley, Norman W. Bristow, John R. Housley, Gerald Woolfe, and Eric C. Wilmshurst, all of Nottingham, England, assignors to Boots Pure Drug Company Limited, Nottingham, England, a British company
No Drawing. Filed May 27, 1959, Ser. No. 816,049
Claims priority, application Great Britain June 4, 1958
1 Claim. (Cl. 260—347.5)

This invention is for improvements in or relating to compounds and compositions based thereon for the treatment of amoebiasis. More particularly it relates to new derivatives of acetanilide and compositions based thereon.

It has already been disclosed that dichloroacet-4-hydroxy-N-methylanilide and specified esters thereof, e.g. benzoates, sulphates and phosphates may be used to control chronic amoebiasis with a great degree of success but the results obtained in attempts to control the acute form have not been so encouraging.

It is an object of the present invention to provide new esters of dichloroacet-4-hydroxy-N-methylanilide which are even more effective than hitherto known compounds in controlling chronic amoebiasis. It is a further object of the present invention to provide novel esters of dichloroacet-4-hydroxy-N-methylanilide which may be used to control acute amoebiasis with a great degree of success. It is also an object of the present invention to provide novel compositions for the treatment of chronic and acute amoebiasis based on the above-mentioned novel esters.

According to the present invention there are provided novel compounds having the general formula:

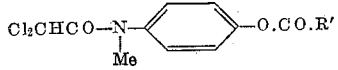

wherein R' represents aryloxyalkyl, aryloxyalkenyl, aryloxyaryl, a heterocyclic group, heterocyclicacalkyl, heterocyclicalkenyl, or the group —R²COOR³ where R² is arylenedioxydialkyl or a disubstituted heterocyclic nucleus and R³ is the 4-(dichloroacet-N-methylamido)phenyl radical, together with simple substituted derivatives of the compounds of the above general formula containing, for example, one or more substituent groups such as halo, nitro, alkyl and alkoxy in the radicals represented by R'.

According to the present invention there are also provided novel compositions for the treatment of amoebiasis which compositions comprise a compound having the general Formula I and a pharmaceutically acceptable carrier or diluent.

The compounds of the invention may be prepared by methods which include steps known in the art for the preparation of esters of phenols and examples are listed below:

(1) The compounds of the invention may be prepared by the interaction of an alkali metal salt of the parent phenol dichloroacet-4-hydroxy-N-methylanilide which is available commercially under the trade name "Entamide" (registered trade mark), with an acid-halide of the general formula R⁴CO.X in which R⁴ represents aryloxyalkyl, aryloxyalkenyl, aryloxyaryl, a heterocyclic group, heterocyclicalkyl, heterocyclicalkenyl or the group —R²CO.X in which R² is as hereinbefore defined and X is halogen.

(2) An alternative method of preparation is by the interaction in the presence of an acid binding agent of the dichloracet-4-hydroxy-N-methylanilide with an acid halide of the general formula R⁴CO.X in which R⁴ and X are as hereinbefore defined.

(3) The compounds may also be prepared by the interaction of dichloroacet-4-hydroxy-N-methylanilide with an acid anhydride of the general formula (R⁵CO)₂O in which R⁵ represents aryloxyalkyl, aryloxyalkenyl, aryloxyaryl, a heterocyclic group, heterocyclicalkyl or heterocyclicalkenyl.

(4) Yet another method of preparation is by the interaction of dichloroacet-4-hydroxy-N-methylanilide with an acid of the general formula R⁶COOH in which R⁶ represents aryloxyalkyl, aryloxyalkenyl, aryloxyaryl, a heterocyclic group, heterocyclicalkyl, heterocyclicalkenyl, or the group —R²COOH in which R² is as hereinbefore defined in the presence of a condensing agent such as dicyclohexylcarbodiimide, dimethylcyanamide, or tetraphosphoric acid.

(5) An alternative method for the preparation of a compound of the general Formula I comprises the step of protecting the amino group of p-aminophenol to give a compound of the general formula:

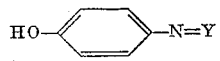

wherein N=Y represents (a) the group —NHR⁷ wherein R⁷ is a formyl, acetyl, or dichloroacetyl group or (b) the group —N=CHR⁸ wherein R⁸ represents a phenyl radical or a substituted phenyl radical followed by the step of esterification to give a compound of the general formula:

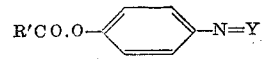

wherein R' and the group —N=Y are as hereinbefore defined, followed by the step of methylation and except in the case where R⁷ is a dichloroacetyl group, selectively hydrolysing the methylated product to yield a compound having the general formula:

where R' is as hereinbefore defined and R⁹ is a hydrogen atom or a dechloroacetyl group and then in the case where R⁹ is hydrogen, dichloroacetylating. This method of preparation is shown diagrammatically in FIGURE I.

The steps of methylating a compound of the general formula:

and of dichloroacetylating a compound of the general formula:

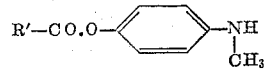

wherein R' in each formula is as above defined are novel.

(6) The compounds may also be prepared by treating 4-(dichloroacet-N-methylamido)phenyl sulphite with an acid of the general formula R⁶COOH in which R⁶ is as hereinbefore defined in the presence of an acid binding agent. This method of preparation is also novel.

The amoebicidal activity of the compounds of the present invention has been demonstrated in animals in the following manner. The technique is substantially that described by Jones (Annals of Tropical Medicine and Parasitology, 1946, 40, 130) in which newly weaned rats are inoculated intracaecally with trophozoites of E.histolytica. Starting on the day after inoculation 5 daily doses of the drug under test are administered by stomach tube to each of a group of rats and the animals are killed one day after the final dose. The caecum of each rat is examined both microscopically and macroscopically and the degree of infection of each rat is assessed on an arbitrary scale. The average degree of infection ("A.D.I.") is then calculated for each group. A compound is regarded as showing promising amoebicidal activity when the "A.D.I." of the treated group is less than half that of an undosed control group. With highly effective drugs the rats are completely cleared of amoebae and the "A.D.I." is then nought. The initial screening tests showed that the preferred group of compounds comprised esters of dichloroacet-4-hydroxy-N-methylanilide with carboxylic acids containing a heterocyclic nucleus or an aryloxy group e.g. 4-(dichloroacet-N-methylamido)phenyl furoate; direct comparison of the furoate showed it to be approximately 4 times as active as the parent phenol dichloroacet-4-hydroxy-N-methylanilide and twice as active as 4-(dichloroacet-N-methylamido)phenyl benzoate.

Clinically amoebiasis occurs in both the acute and chronic form and of these only the chronic disease has been satisfactorily controlled by dichloroacet-4-hydroxy-N-methylanilide and those esters which are described in B.P. 767,148 and 794,762. We have now discovered that the member of the preferred group of compounds of the present invention which has been selected for clinical trials, viz. 4-(dichloroacet-N-methylamido)phenyl 2-furoate, not only shows increased activity against chornic amoebiasis but also shows highly successful activity against the acute form of the disease which may be completely cured by the administration of 4-(dichloroacet-N-methylamido)phenyl furoate at a dose rate of 20 mg./kg. per day for 10 days. The total dose may vary from 15 mg. to 75 mg./kg./day, being preferably 20–40 mg./kg./day, and this dose may be supplied in the form of dosage units which may contain from 100 mg. to 1000 mg. of active material, the dosage units being administered preferably in divided doses throughout the day e.g. 3 or 4 times per day.

The compositions which are provided according to the present invention are adapted for administration per os. They may be in the form of solid compositions such as tablets, lozenges, capsules and the like or in the form of liquids such as suspensions. In the form of tablets, lozenges and the like the diluents which may be employed in the preparation of the compositions of the invention are non-toxic substances compatible with the compounds of the invention and include extenders, solvents, suspending agents, binding agents, flavourings and the like. Capsules may comprise the pure compounds of the present invention or the compounds admixed with a pharmaceutically acceptable diluent enclosed within the encapsulating medium.

A tablet which is a convenient form to administer the active compounds of the present invention may comprise the active compound in association with any suitable diluent normally employed in the manufacture of tablets and we have found that icing sugar and maize starch give a very satisfactory product which is conveniently one of from 5–10 grains total weight. There may also be included in the composition a granulating agent and we prefer to use gum acacia. Small quantities of a lubricant may be included if desired and stearic acid has been found to be highly satisfactory. There may also be included, if desired, colouring and flavouring agents.

Liquid compositions suitable for oral administration of the compounds of the invention include suspensions and syrups comprising the active ingredient in association with compatible suspending agents and the like which are well known in the art.

FIGURE I

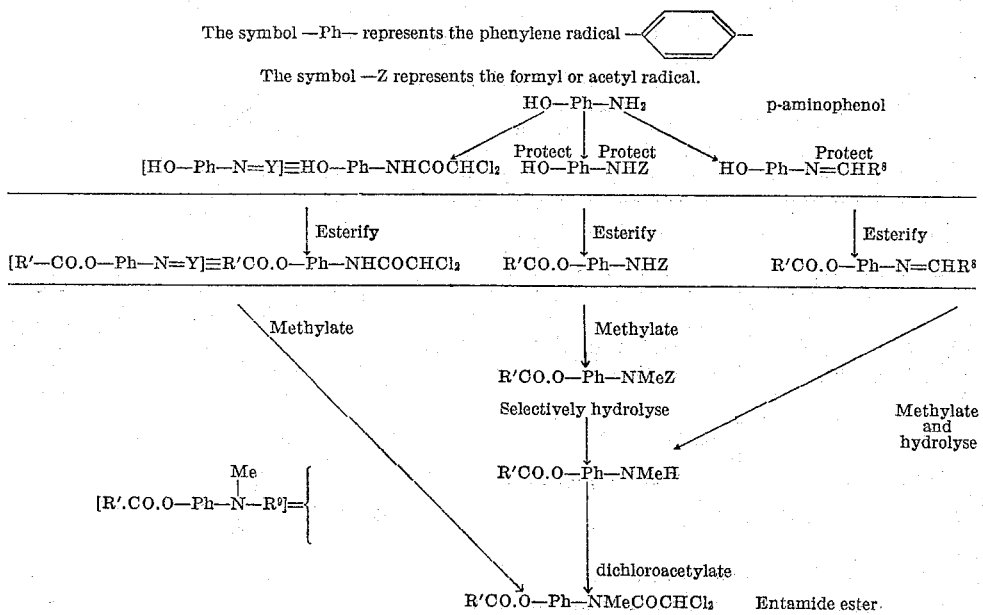

The following non-limitative examples illustrate the invention:

Example 1

In the preparation of 4-(dichloroacet-N-methylamido)-phenyl 2-furoate, 13.7 grams of 2-furoyl chloride are added slowly to a stirred solution of 23.4 grams of dichloroacet-4-hydroxy-N-methylanilide in 50 ml. of dry pyridine, water cooling being used to keep the temperature below 25° C. The reaction mixture is stirred for a further 40 minutes and then diluted with 400 ml. of ice water containing 100 mg. of sodium hydrosulphite. The product is collected by filtration and recrystallised from 95% alcohol. There is thus obtained 4-(dichloroacet-N-methylamido)phenyl 2-furoate as a crystalline solid which has a melting point of 112.5–114° C. (Found: C, 51.2; H, 3.4. $C_{14}H_{11}Cl_2NO_4$ requires C, 51.2; H, 3.35%).

In a similar manner are prepared the following esters:
4-(dichloroacet-N-methylamido)phenyl 4 - methoxyphenoxy-acetate M.P. 93–94.5° C. (Found: C, 54.6; H, 4.4. $C_{18}H_{17}Cl_2NO_5$ requires C, 54.2; H, 4.3%).

4-(dichloroacet - N - methylamido)phenyl phenoxy-acetate M.P. 108–109° C. (Found: C, 55.3; H, 4.0. $C_{17}H_{15}Cl_2NO_4$ requires C, 55.4; H, 4.1%).

4 - (dichloroacet - N - methylamido)phenyl 2 - thenoate M.P. 134–135° C. (Found: C, 49.1; H, 3.0. $C_{14}H_{11}Cl_2NO_3S$ requires C, 48.8; H, 3.2%).

4 - (dichloroacet - N - methylamido)phenyl beta-naphthoxyacetate M.P. 121–122° C. (Found: C, 60.4; H, 3.7. $C_{21}H_{17}Cl_2NO_4$ requires C, 60.3; H, 4.1%).

4 - (dichloroacet - N - methylamido)phenyl 2 - chlorophenoxyacetate M.P. 102–104° C. (Found: C, 50.5; H, 3.1. $C_{17}H_{14}Cl_3NO_4$ requires C, 50.7; H, 3.5%).

4 - (dichloroacet - N - methylamido)phenyl 4 - methylphenoxyacetate M.P. 69–71° C. (Found: C, 56.6; H, 4.4. $C_{18}H_{17}Cl_2NO_4$ requires C, 56.55; H, 4.45%).

4 - (dichloroacet - N - methylamido)phenyl alpha- (2 - methylphenoxy)propionate M.P. 107–108° C. (Found: C, 57.7; H, 5.2. $C_{19}H_{19}Cl_2NO_4$ requires C, 57.6; H, 4.8%).

4 - (dichloroacet - N - methylamido)phenyl 5 - bromo-2-furoate M.P. 101–103° C. (Found: C, 40.9; H, 2.4. $C_{14}H_{10}BrCl_2NO_4$ requires C, 41.3; H, 2.5%).

*Example 2*

By the method described in Example 1 but crystallising five times from alcohol, and once from benzene followed by dissolving in acetone and drowning in ice-cold N NaOH and a final crystallisation from 95% alcohol there is obtained 4-(dichloroacet-N-methylamido)phenyl 4-nitrophenoxyacetate M.P. 133–135° C. (Found: C, 49.5; H, 3.6. $C_{17}H_{14}Cl_2N_2O_6$ requires C, 48.9; H, 3.4%).

*Example 3*

By the method described in Example 1 but collecting the crude oily product by extraction with chloroform, washing the chloroform solution with half-normal sulphuric acid, aqueous sodium bicarbonate solution and water, drying the solution with anhydrous magnesium sulphate, removing the chloroform by distillation and crystallising the residue from 95% alcohol there are obtained the following as crystalline solids:

4 - (dichloroacet - N - methylamido)phenyl - γ - phenoxybutyrate M.P. 61–62° C. (Found: C, 57.8; H, 5.0. $C_{19}H_{19}Cl_2NO_4$ requires C, 57.6; H, 4.8%).

4 - (dichloroacet - N - methylamido)phenyl 3 - chlorophenoxyacetate M.P. 80–81° C. (Found: C, 50.6; H, 3.8. $C_{17}H_{14}Cl_3NO_4$ requires C, 50.7; H, 3.5%).

4 - (dichloroacet - N - methylamido)phenyl 2 - phenoxybenzoate M.P. 92–93° C. (Found: C, 61.1; H, 4.0. $C_{22}H_{17}Cl_2NO_4$ requires C, 61.4; H, 3.95%).

*Example 4*

In the preparation of 4-(chloroacet-N-methylamido)-phenyl nicotinate, 32.5 grams of nicotinyl chloride hydrochloride are added to a stirred solution of 45 grams of dichloroacet-4-hydroxy-N-methylanilide in 140 ml. of dry pyridine. After being stirred 90 minutes the reaction mixture is quenched with ice water and the product is isolated as in Example 1. There is thus obtained as a crystalline solid 4-(dichloroacet-N-methylamido)phenyl nicotinate which has a melting point of 167–170° C. (Found: C, 53.4; H, 3.5; N, 8.6. $C_{15}H_{12}Cl_2N_2O_3$ requires C, 53.1; H, 3.5; N, 8.3%).

In a similar manner there is prepared 4-(dichloroacet-N-methylamido)phenyl picolinate M.P. 130–131° C. (Found: C, 53.1; H, 3.7. $C_{15}H_{12}Cl_2N_2O_3$ requires C, 53.1; H, 3.5%).

*Example 5*

In the preparation of 4-(dichloroacet-N-methylamido)-phenyl isonicotinate 6.4 ml. of benzene sulphonyl chloride are added to a solution of 12.3 grams of isonicotinic acid in 50 ml. of dry pyridine, the temperature rising to 65° C. The solution is stirred at 45° C. for 15 minutes and then heated to 90° C. A solution of 11.7 grams of dichloroacet-4-hydroxy-N-methylanilide in 20 ml. of dry pyridine is added slowly to the stirred solution and stirring at 90° C. is continued for 30 minutes. The solution is cooled, poured into 300 ml. of ice water and the crude product is filtered off and crystallised twice from 95% alcohol. There is thus obtained 4-(dichloroacet-N-methylamido)phenyl isonicotinate which has a melting point of 125–126.5° C. (Found: C, 53.0; H, 3.3. $C_{15}H_{12}Cl_2N_2O_3$ requires C, 53.1; H, 3.5%).

In a similar manner is prepared the following ester:
4 - (dichloroacet - N - methylamido)phenyl 2 - furylacrylate M.P. 115–117° C. (Found: C, 54.4; H, 3.6. $C_{16}H_{13}Cl_2NO_4$ requires C, 54.2; H, 3.7%).

*Example 6*

In the preparation of 4-(dichloroacet-N-methylamido)-phenyl alpha-phenoxyisobutyrate 11.7 grams of dichloroacet-4-hydroxy-N-methylanilide is slowly added to a solution of 10 grams of alpha-phenoxyisobutyryl chloride in 50 ml. of dry pyridine and the mixture is maintained at about 20° C. for 20 hours. The reaction mixture is poured into 500 ml. of ice water and the crude product is filtered off, washed with dilute sulphuric acid and water and is crystallised from methanol. There is thus obtained as a crystalline solid 4-(dichloroacet-N-methylamido)phenyl alpha-phenoxyisobutyrate which has a melting point of 85–86° C. (Found: C, 57.5; H, 4.6; N, 3.6. $C_{19}H_{19}Cl_2NO_4$ requires C, 57.6; H, 4.8; N, 3.5%).

*Example 7*

By the method described in Example 6 but crystallising the crude product twice from a mixture of chloroform and methanol there is obtained as a crystalline solid 4-(dichloroacet-N-methylamido)phenyl coumarilate which has a melting point of 151–153° C. (Found: C, 57.4; H, 3.4; N, 4.0. $C_{18}H_{13}Cl_2NO_4$ requires C, 57.1; H, 3.4; N, 3.7%).

*Example 8*

By the method described in Example 6 but extracting the gummy product with ether, washing the ethereal solution with 5 N sulphuric acid, water, 2 N sodium hydroxide and water evaporation of the solvent and crystallisation of the gummy product from methanol there is obtained as a crystalline solid 4-(dichloroacet-N-methylamido)phenyl alpha-phenoxypropionate which has a melting point of 61–62° C. (Found: C, 56.6; H, 4.45; N, 3.7. $C_{18}H_{17}Cl_2NO_4$ requires C, 56.55; H, 4.45; N, 3.7%).

*Example 9*

By the method described in Example 8 there is obtained as a gum the following esters.

4 - (dichloroacet - N - methylamido)phenyl alpha-phenoxy-n-butyrate. (Found: C, 57.9; H, 5.2; N, 3.9. $C_{19}H_{19}Cl_2NO_4$ requires C, 57.6; H, 4.8; N, 3.5%).

4-(dichloroacet-N-methylamido)phenyl alpha-phenoxy-n-valerate. (Found: C, 58.8; H, 5.2 $C_{20}H_{21}Cl_2NO_4$ requires C, 58.5; H, 5.1%).

4-(dichloroacet-N-methylamido)phenyl alpha-phenoxy-n-hexanoate. (Found: C, 59.6; H, 5.25. $C_{21}H_{23}Cl_2NO_4$ requires C, 59.4; H, 5.4%).

*Example 10*

In the preparation of 4-(dichloroacet-N-methylamido)phenyl beta-phenoxypropionate, 9.3 grams of thionyl chloride are added to a stirred suspension of 12.9 grams of beta-phenoxypropionic acid in 50 ml. of dry ether and the mixture is maintained at about 20° C. for 16 hours under anhydrous conditions. The solvent is distilled off at 20° C. under reduced pressure and 11.85 grams of the gummy residue are dissolved in 60 ml. of dry pyridine. To the solution is added a solution of 15 grams of dichloroacet-4-hydroxy-N-methylanilide in dry pyridine. The reaction mixture is drowned in water and the product is collected with ether and crystallised as described in Example 8. There is thus obtained as a crystalline solid 4-(dichloroacet - N - methylamido)phenyl beta - phenoxypropionate which has a melting point of 61–62° C. (Found: C, 56.5; H, 4.7. $C_{18}H_{17}Cl_2NO_4$ requires C, 56.55; H, 4.45%).

Example 11

In the preparation of 4-(dichloroacet-N-methylamido)phenyl beta-phenoxypropionate, 2.32 ml. of benzoyl chloride dissolved in 10 ml. of dry benzene are added dropwise at room temperature to a stirred suspension of 3.76 grams of finely powdered sodium beta-phenoxypropionate in 40 ml. of dry benzene and the stirring is continued for a further 90 minutes. To the stirred solution of the mixed anhydride thus formed there is added a solution of 4.68 grams of dichloroacet-4-hydroxy-N-methylanilide in 50 ml. of dry pyridine and the reaction mixture is allowed to stand for about 16 hours and is then poured into 200 ml. of water. The aqueous phase is washed with ether and the ethereal extract is added to the solvent phase. The combined organic phase is washed successively with 5 N sulphuric acid, water, 2 N sodium hydroxide and finally water. It is dried with anhydrous sodium sulphate and the solvent is distilled off. The residue is crystallised twice from aqueous methanol and there is thus obtained as a crystalline solid 4-(dichloroacet - N - methylamido)phenyl beta - phenoxypropionate which has a melting point of 60–61° C. A mixed melting point of this material together with that prepared according to Example 10 is also 60–61° C.

Example 12

In the preparation of 4-(dichloroacet-N-methylamido)phenyl tetrahydro-2-furoate 11.2 grams of dicyclohexylcarbodiimide is added to a warm mixture of 6.27 grams of tetrahydro-2-furoic acid, 12.6 grams of dichloroacet-4-hydroxy-N-methylanilide and 100 ml. of methylene chloride and the mixture is allowed to stand overnight at 20° C. To the mixture is added 1 ml. of glacial acetic acid and after one hour the solution is filtered and the filtrate is washed with aqueous N sodium carbonate solution, ice cold 2 N sodium hydroxide solution and water. It is dried with anhydrous magnesium sulphate and evaporated to an oil which is dissolved in a mixture of equal volumes of benzene and 60–80° C. petroleum ether. The solution is cooled to 0° C. for three hours, filtered and evaporated to an oil which is distilled in vacuo. There is thus obtained as an oil 4-dichloroacet-N-methylamido)phenyl tetrahydro-2-furoate which has a boiling point of 175° C. under a pressure of 0.01 mm. Hg. (Found: C, 50.8; H, 4.5. $C_{14}H_{15}Cl_2NO_4$ requires C, 50.6; H, 4.5%).

Example 13

In the preparation of 4-(dichloroacet-N-methylamido)phenyl 3-furoate 6.75 grams of dicyclohexylcarbodiimide is added to a warm mixture of 3.6 grams of 3-furoic acid, 7.7 grams of dichloroacet-4-hydroxy-N-methylanilide and 75 ml. of methylene chloride and the mixture is allowed to stand overnight at 20° C. To the mixture is added 2 ml. of glacial acetic acid and after standing for 5 hours it is filtered, the filtrate is washed with ice cold 2 N sodium hydroxide solution, then water, and is dried with anhydrous magnesium sulphate. The solvent is evaporated off and the residue is crystallised twice from 95% ethanol. There is thus obtained as a crystalline solid 4-(dichloroacet-N-methylamido)phenyl 3-furoate which has a melting point of 105.5–107° C. (Found: C, 51.5; H, 3.6. $C_{14}H_{11}Cl_2NO_4$ requires C, 51.2; H, 3.35%).

In a similar manner there are prepared the following esters:

4-(dichloroacet-N-methylamido)phenyl 4:5-dibromo-2-furoate M.P. 142–144° C. (Found: C, 34.8; H, 1.8. $C_{14}H_9Br_2Cl_2NO_4$ requires C, 34.6; H, 1.85%).

4-(dichloroacet - N - methylamido)phenyl 5 - methyl-2-furoate M.P. 129–131° C. (Found: C, 52.1; H, 3.8. $C_{15}H_{13}Cl_2NO_4$ requires C, 52.6; H, 3.8%).

4-(dichloroacet-N-methylamido)phenyl γ:γ-bis(fur-2-yl)-n-valerate. (Found: C, 58.5; H, 5.1. $C_{22}H_{21}Cl_2NO_5$ requires C, 58.6; H, 4.7%).

4-(dichloroacet - N - methylamido)phenyl alpha-alpha-di-(5-methylfur-2-yl)-propionate M.P. 105–106° C. Found: C, 58.3; H, 5.0. $C_{22}H_{21}Cl_2NO_5$ requires C, 58.6; H, 4.7%).

Example 14

By the method described in Example 1 save that the acid chloride is dissolved in acetone before addition to the solution of dichloroacet-4-hydroxy-N-methylanilide in pyridine there is obtained as a crystalline solid 4-(dichloroacet-N-methylamido)phenyl quinoline-2-carboxylate M.P. 143–145° C. (Found: C, 58.3; H, 3.6. $C_{19}H_{14}Cl_2N_2O_3$ requires C, 58.6; H, 3.6%).

Example 15

By the method described in Example 14 but crystallising from acetic acid there is obtained as a crystalline solid di[4-dichloroacet-N-methylamido phenyl] furan-2:5-dicarboxylate M.P. 194–194.5° C. (Found: C, 48.6; H, 3.0. $C_{24}H_{18}Cl_4N_2O_7$ requires C, 49.0; H, 3.1%).

Example 16

In the preparation of 4(dichloroacet-N-methylamido)phenyl pyrazinoate a solution of pyrazinoyl chloride (7.2 grams) in acetone (70 ml.) is slowly added to a stirred solution of dichloroacet-4-hydroxy-N-methylanilide (11.1 grams) in pyridine (35 ml.). Stirring is continued for half an hour and the reaction mixture is poured into water (400 ml.). The gum which settles out is collected with chloroform and the chloroform solution is washed successively with dilute sulphuric acid, aqueous sodium bicarbonate and water. The solution is dried over anhydrous magnesium sulphate and is evaporated to give a gum which is dissolved in methanol. The methanol solution is evaporated to give a solid which is recrystallised from alcohol. There is thus obtained as a crystalline solid 4-(dichloroacet-N-methylamido)phenyl pyrazinoate M.P. 115–117° C. (Found: C, 49.0; H, 3.5; N, 12.0. $C_{14}H_{11}Cl_2N_3O_3$ requires C, 49.4; H, 3.2; N, 12.4%).

Example 17

In the preparation of di[4-dichloroacet-N-methylamidophenyl] para-phenylenedioxydiacetate a solution of para-phenylenedioxydiacetyl chloride (11.46 grams) in acetone is added to a stirred solution of dichloroacet-4-hydroxy-N-methylanilide (20 grams) in pyridine (50 ml.). After stirring for two hours at room temperature the reaction mixture is poured into water and the gum which separates is extracted with chloroform. The chloroform solution is washed successively with water, aqueous sodium hydroxide, dilute sulphuric acid and aqueous sodium carbonate solution, dried over anhydrous magnesium sulphate and evaporated to dryness. The solid is crystallised from acetic acid and there is thus obtained as a crystalline solid di[4 - dichloroacet - N - methylamido-phenyl] para-phenylenedioxydiacetate M.P. 153–154° C. (Found: C, 51.4; H, 3.7. $C_{28}H_{24}Cl_4N_2O_8$ requires C, 51.1; H, 3.65%).

Example 18

In the preparation of 4-(dichloroacet-N-methylamido)-phenyl 5-nitro-2-furoate, 5-nitro-2-furoic acid (3.95 grams) is refluxed for 24 hours with thionyl chloride (5 ml.), a further 5 ml. of thionyl chloride is added and the refluxing is continued for a further 8 hours. The solution is distilled to dryness, the crude acid chloride is dissolved in acetone and added to a stirred solution of dichloroacet-4-hydroxy-N-methylanilide (4.7 grams) in pyridine (20 ml.). The product is isolated and purified as described in Example 1 and there is thus obtained 4-(dichloroacet-N-methylamido)phenyl 5-nitro-2-furoate M.P. 116–117° C. (Found: C, 45.1; H, 2.9. $C_{14}H_{10}Cl_2N_2O_6$ requires C, 45.0; H, 2.7%).

Example 19

In the preparation of 4-(dichloroacet-N-methylamido)-phenyl 5-methoxycoumarilate, 5-methoxycoumarilic acid (2 grams) is heated with thionyl chloride (10 ml.) under reflux for one hour and then distilled to dryness. The crude acid chloride is dissolved in 30 ml. of dry pyridine and 2.4 grams of dichloroacet-4-hydroxy-N-methylanilide is added slowly and the reaction mixture left at room temperature for 20 hours. The product is isolated and purified as described in Example 6 and there is thus obtained as a crystalline solid 4-(dichloroacet-N-methylamido)phenyl 5-methoxycoumarilate M.P. 151–152° C. (Found: C, 55.5; H, 3.6. $C_{19}H_{15}Cl_2NO_5$ requires C, 55.9; H, 3.7%).

In a similar manner there are prepared the following esters.

4-(dichloroacet-N-methylamido)phenyl 5:7 - dibromocoumarilate M.P. 171° C. (Found: C, 40.1; H, 2.0. $C_{18}H_{11}Br_2Cl_2NO_4$ requires C, 40.3; H, 2.05%).

4-(dichloroacet-N-methylamido)phenyl 7-methoxycoumarilate M.P. 183–184° C. (Found: C, 55.7; H, 3.8. $C_{19}H_{15}Cl_2NO_5$ requires C, 55.9; H, 3.7%).

*Example 20*

In the preparation of 4-(dichloroacet-N-methylamido)-phenyl 2-furoate a mixture of dichloroacet-4-hydroxy-N-methylanilide (23.4 grams), 2-furoic acid (11.2 grams) and tetraphosphoric acid (55 grams), is stirred and heated on the steam bath for 24 hours. The viscous product is triturated with water and the black solid which results is ground with dilute aqueous sodium hydroxide solution, washed with water and drained. It is extracted with boiling alcohol, filtered and left to crystallise at 0° C. There is thus obtained as a crystalline solid 4-(dichloroacet-N-methylamido)phenyl 2-furoate M.P. 111–112° C. which is undepressed in admixture with material made as described in Example 1.

*Example 21*

In the preparation of 4-(dichloroacet-N-methylamido)-phenyl 2-furoate a mixture of 4-dichloroacetamidophenyl 2-furoate (12.1 grams), anhydrous potassium carbonate (12 grams), acetone (60 ml.) and dimethyl sulphate (4 ml.) is refluxed for 4 hours. The filtered solution is then evaporated under reduced pressure to give an oil, which crystallises on cooling. Two recrystallisations from 95% alcohol give the title compound in the form of a crystalline solid, M.P. 109–111° C., identical with the substance prepared in Example 1.

In the preparation of 4-dichloroacetamidophenyl 2-furoate, 2-furoyl chloride (10.9 grams) is added over 20 minutes to an ice-cooled, stirred suspension of 4-dichloroacetamidophenol (17.6 grams) in pyridine (60 ml.). After stirring for a further 20 minutes the solution is poured into water (250 ml.) and the precipitated solid is collected by filtration, washed with water, triturated with 95% alcohol (300 ml.) and recrystallised from acetone (150 ml.) with charcoal, giving the title compound in the form of a crystalline solid, M.P. 201–202° C. (Found: C, 49.6; H, 2.9. $C_{13}H_9Cl_2NO_4$ requires C, 49.7; H, 2.9%).

*Example 22*

A batch of tablets is prepared from the following ingredients:

| | |
|---|---|
| 4-(dichloroacet-N-methylamido)phenyl 2-furoate | 30 lbs. 13⅝ oz. |
| Icing sugar | 1 lb. 8 oz. |
| Maize starch | 7 lbs. 8 oz. |
| Acacia solution 20% | 75 fluid oz. |
| Stearic acid | 3 oz. |

The 4-(dichloroacet-N-methylamido)phenyl 2-furoate, icing sugar and 2½ lbs. of maize starch are thoroughly mixed together and the mixture is granulated with the addition of the 20% acacia solution.

The granules are dried, sieved and to them is added a further 5 lbs. of dried maize starch with mixing followed by the stearic acid. After a final mixing the mixture is tabletted to give a batch of 28,000 10 gr. tablets each containing 0.5 gram of active ingredient.

*Example 23*

Entamide (11.7 grams) was dissolved in water (55 ml.) and caustic liquor (5 ml. 50% w./v. 1.25 moles). At room temperature, furoyl chloride (7.2 grams 1.1 moles) was added and the mixture shaken vigorously. After several minutes, the product was collected with suction, washed with a little dilute sodium hydroxide solution, and finally washed with water. The crude granular product was crystallised from alcohol (50 ml.) with charcoal, giving 6.1 grams (37% of theory) of a product M.P. and mixed M.P. 112–114° C.

We claim:

4-(dichloroacet-N-methylamido) phenyl 2-furoate.

References Cited in the file of this patent

UNITED STATES PATENTS 2,912,438  Oxley _____ Nov. 10, 1959

FOREIGN PATENTS 767,148  Great Britain _____ Jan. 30, 1957
794,762  Great Britain _____ May 7, 1958

OTHER REFERENCES

Vass et al.: Chem. Absts., vol. 25 (1931), pp. 1797–8.
Karrer: Organic Chemistry, 2nd ed. (1946), Elsevier Publishing Co., pages 82 and 199.
Whitmore: Organic Chemistry (1951), page 171.